(12) United States Patent
Gupta (10) Patent No.: US 11,574,297 B2
(45) Date of Patent: Feb. 7, 2023

(54) SMART CARD WITH DISTRIBUTED PAYMENT CHANNELS AND AUTONOMOUS RESOLUTION THEREOF

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 230 days.

(21) Appl. No.: 17/060,119

(22) Filed: Oct. 1, 2020

(65) Prior Publication Data

US 2022/0108301 A1 Apr. 7, 2022

(51) Int. Cl.

| | |
|---|---|
| *G06Q 20/34* | (2012.01) |
| *G06Q 20/02* | (2012.01) |
| *G06Q 20/42* | (2012.01) |
| *G06Q 20/40* | (2012.01) |
| *G06N 20/00* | (2019.01) |
| *G06F 16/23* | (2019.01) |
| *G06F 16/245* | (2019.01) |
| *G06Q 40/02* | (2012.01) |
| *G06K 19/07* | (2006.01) |

(52) U.S. Cl.
CPC ..... *G06Q 20/3415* (2013.01); *G06F 16/2379* (2019.01); *G06F 16/245* (2019.01); *G06N 20/00* (2019.01); *G06Q 20/027* (2013.01); *G06Q 20/352* (2013.01); *G06Q 20/405* (2013.01); *G06Q 20/4012* (2013.01); *G06Q 20/4037* (2013.01); *G06Q 20/42* (2013.01); *G06Q 40/02* (2013.01); *G06K 19/0723* (2013.01); *G06Q 2220/00* (2013.01)

(58) Field of Classification Search
CPC ..... G06Q 20/00–425; G06Q 40/00–02; G06Q 2220/00–18; G06F 16/00–387; G06N 20/00–20; G06K 19/00–18
See application file for complete search history.

(56) References Cited

U.S. PATENT DOCUMENTS

| | | | |
|---|---|---|---|
| 9,665,818 B1* | 5/2017 | Cardinal | G06K 19/0704 |
| 10,839,656 B1* | 11/2020 | Harmon | G05D 19/02 |
| 11,049,153 B2* | 6/2021 | Pizza | G06Q 30/0282 |
| 11,373,182 B2* | 6/2022 | Gilliam, III | G06Q 20/40 |
| 2015/0339638 A1* | 11/2015 | DeLuca | G06Q 20/3224 705/39 |

(Continued)

*Primary Examiner* — John W Hayes
*Assistant Examiner* — Chenyuh Kuo
(74) *Attorney, Agent, or Firm* — Weiss & Arons LLP (57) ABSTRACT

Systems and methods for autonomous payment routing are provided. A method may include storing in a smart card a database of contacts accessed from a digital contact directory. The method may include receiving a request to reroute a payment via an alternate payment channel, the payment including a recipient and an amount, and the alternate payment channel originating from an account associated with one of the contacts in the database. The method may also include resolving, via a wireless communication element that is embedded in the smart card, routing information for the account. The method may also include transmitting, to an administrator of the account, a request for authorization to reroute the payment, and, when authorization is received, executing the payment via the alternate payment channel.

17 Claims, 8 Drawing Sheets

(56) References Cited

U.S. PATENT DOCUMENTS

2017/0289127 A1* 10/2017 Hendrick ............ H04W 12/065
2018/0330356 A1* 11/2018 England .................. H04L 51/18
2019/0286805 A1* 9/2019 Law ........................ G06F 21/34

* cited by examiner

FIG. 10

SMART CARD WITH DISTRIBUTED PAYMENT CHANNELS AND AUTONOMOUS RESOLUTION THEREOF

FIELD OF TECHNOLOGY

Aspects of the disclosure relate to computer systems. Specifically, aspects of the disclosure relate to smart payment instruments with enhanced communication and processing features.

BACKGROUND OF THE DISCLOSURE

Users of payment instruments often execute online transactions and payments. When executing online transactions and payments, users typically enter credit card information or other sensitive transaction information into a web browser or mobile application. However, doing so increases a risk that the sensitive transaction information will be exposed. For example, security associated with the web browser may be substandard or the security of another network system utilized by a mobile application may be compromised. These potential security flaws associated with third-party systems that transmit and capture sensitive transaction information may increase the exposure risk.

In addition to security breaches of even reputable third-party systems, rogue systems exist which are designed to masquerade as reputable systems or webpages, and thereby induce the user to enter sensitive transaction information. The rogue system may then expose the captured sensitive transaction information at a loss to the user.

Recently, use of digital wallets has proliferated. These digital wallets are typically associated with more reliable security than prior systems. However, even use of a digital wallet does not fully address the challenges in securing sensitive transaction information. For example, when using digital wallets, sensitive transaction information may still be captured using third-party applications that may track use and content of the sensitive transaction information. By increasing the number of parties that handle the sensitive transaction information, there is an associated increase in risk that the sensitive transaction information will be inadvertently disclosed.

It would therefore be desirable to provide more secure apparatus and methods to execute online transactions without providing sensitive transaction information to any third-party system. It would be further desirable for the apparatus and methods to include enhanced routing features to increase efficiency and functionality.

SUMMARY OF THE DISCLOSURE

Aspects of the disclosure relate to a platform with autonomous payment routing. The platform may include a smart card. The smart card may include a microprocessor, a display screen, and a power source for the microprocessor and the display screen.

The smart card may also include an input element configured to receive user input, a wireless communication element configured to provide wireless communication between the smart card and a central system and/or payment gateway, and a non-transitory memory storing computer-executable instructions configured to run on the microprocessor.

The smart card may be configured to access a digital contact directory associated with a user of the smart card. Each contact in the directory may be associated with a name and a phone number. The smart card may be configured to store in the memory a database of contacts accessed from the directory. The smart card may be configured to receive a request, via the input element, to reroute a payment via an alternate payment channel. The payment may include a recipient and an amount. The alternate payment channel may originate from an account associated with one of the contacts in the database.

The smart card may be configured to display, on the display screen, confirmation of the request. The smart card may be configured to resolve, via the wireless communication element, routing information for the account. The smart card may be configured to transmit, to an administrator of the account, a request for authorization to reroute the payment. When authorization is received, the smart card may be configured to execute the payment via the alternate payment channel.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Systems and methods for autonomous payment routing are provided. Systems and methods may include a platform which may include a smart card.

In certain embodiments, the smart card may include a housing made from metal and/or plastic. The card may at least partially resemble a typical debit or credit card. The housing may have dimensions that conform to the ISO/IEC 7810 ID-1 standard. The dimensions may, in some embodiments, be no greater than 86 millimeters×54 millimeters×0.8 millimeters.

The smart card may include a microprocessor and/or a display screen. The smart card may include a power source for the microprocessor, the display screen, and/or other smart card components. The smart card may include a wireless communication element configured to provide wireless communication between the smart card and a central system and/or payment gateway. In certain embodiments, the wireless communication element may be a nano wireless network interface card ("NIC"). The smart card may include a non-transitory memory storing computer-executable instructions that, when run on the microprocessor, may be configured to perform some or all the disclosed features of the platform.

In some embodiments, the power source may be rechargeable. The power source may recharge via solar energy. The power source may recharge via inductive charging, e.g., with a wireless recharging mechanism. The power source may recharge via a charging port. A charging port may include mini or micro Universal Serial Bus (USB) connectors, or any other suitable connector. The power source may recharge via any other suitable charging mechanism.

The smart card may also include an input element configured to receive user input. One example of an input element may be a tactile sensor. The tactile sensor may be a keypad. The keypad may be a part of a touchscreen. The touchscreen may also include the display screen. Another example of an input element may be an audio sensor, such as a microphone. The microphone may receive verbal requests that may be deciphered by a language processing engine. The language processing engine may be native to the smart card.

The microprocessor, the display screen, the input element, the power source, the wireless communication element, and/or the memory may be embedded in the smart card.

The smart card may be configured to access a digital contact directory associated with a user of the smart card. The directory may, in certain embodiments, be cloud-based. Each contact in the directory may be associated with a name and a phone number. The directory may include acquaintances of the user.

The smart card may be configured to store in the memory a database of contacts accessed from the directory. The database may include all the contacts contained in the directory. In some embodiments, the database may be a subset of the directory. For example, the smart card may filter the directly based on predetermined rules. The rules may include generating scores based on metrics such as recent calls. The rules may also include a preset list of "favorites" or any other suitable metric.

The smart card may be configured to receive a request, via the input element, to reroute a payment via an alternate payment channel. Rerouting a payment via an alternate payment channel may, for example, include executing a payment, due for a first account, from a second account. The payment may include a recipient and an amount. The alternate payment channel may originate from an account associated with one of the contacts in the database.

The smart card may be configured to display, on the display screen, confirmation of the request. The smart card may be configured to resolve, via the wireless communication element, routing information for the account. The smart card may be configured to transmit, to an administrator of the account, a request for authorization to reroute the payment. In some embodiments, authorization may include entry of a personal identification number (PIN). When authorization is received, the smart card may be configured to execute the payment via the alternate payment channel.

In certain embodiments, the smart card may be further configured to automatically trigger an alert when the amount of the payment exceeds a predetermined threshold. Exceeding the predetermined threshold may include a scenario wherein the amount of the payment exceeds a predetermined percentage of a balance associated with the user. Exceeding the predetermined threshold may also include a scenario wherein the amount of the payment subtracted from the balance leaves a remaining balance that is below a predetermined safe remaining balance. The alert may include a message displayed on the display screen, and the message may include a prompt for entering a request to reroute the payment.

In some embodiments, the smart card may also include an artificial-intelligence (AI)-based recommendation engine. The recommendation engine may be configured to generate a recommended list of contacts. The recommended list may be a subset of the database of contacts stored in the memory.

The recommendation engine may generate the recommended list of contacts based on one or more factors that indicate an increased probability of successful authorization to reroute the payment. The one or more factors may include an account balance of the contact, a relationship between the user and the contact, and a history of successful authorizations by the contact. The smart card may be configured to present the recommended list on the display screen when the request to reroute the payment is received.

In certain embodiments, the resolving the routing information for the account may include searching a plurality of financial institutions for the account by providing the name and phone number of the contact associated with the account. When the search locates the account at one of the financial institutions, the smart card may be configured to relay, to the one of the financial institutions, the authorization of the administrator to reroute the payment.

In certain embodiments, both the user and the administrator of the alternative account may use smart cards according to aspects of the disclose. In some embodiments, only one party (the user or the administrator of the alternative account) may use the smart card, and the other party may transmit the request or authorize the rerouting from any suitable computing device.

A method for autonomous payment routing is provided. The method may include: accessing a digital contact directory associated with a user of a smart card, each contact in the directory associated with a name and a phone number; storing, in a non-transitory memory that is embedded in the smart card, a database of contacts accessed from the directory; receiving a request, via an input element embedded in the smart card, to reroute a payment via an alternate payment channel, said payment comprising a recipient and an amount, and said alternate payment channel originating from an account associated with one of the contacts in the database; displaying, on a display screen that is embedded in the smart card, confirmation of the request; resolving, via a wireless communication element that is embedded in the smart card, routing information for the account; transmitting, to an administrator of the account, a request for authorization to reroute the payment; and, when authorization is received, executing the payment via the alternate payment channel.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
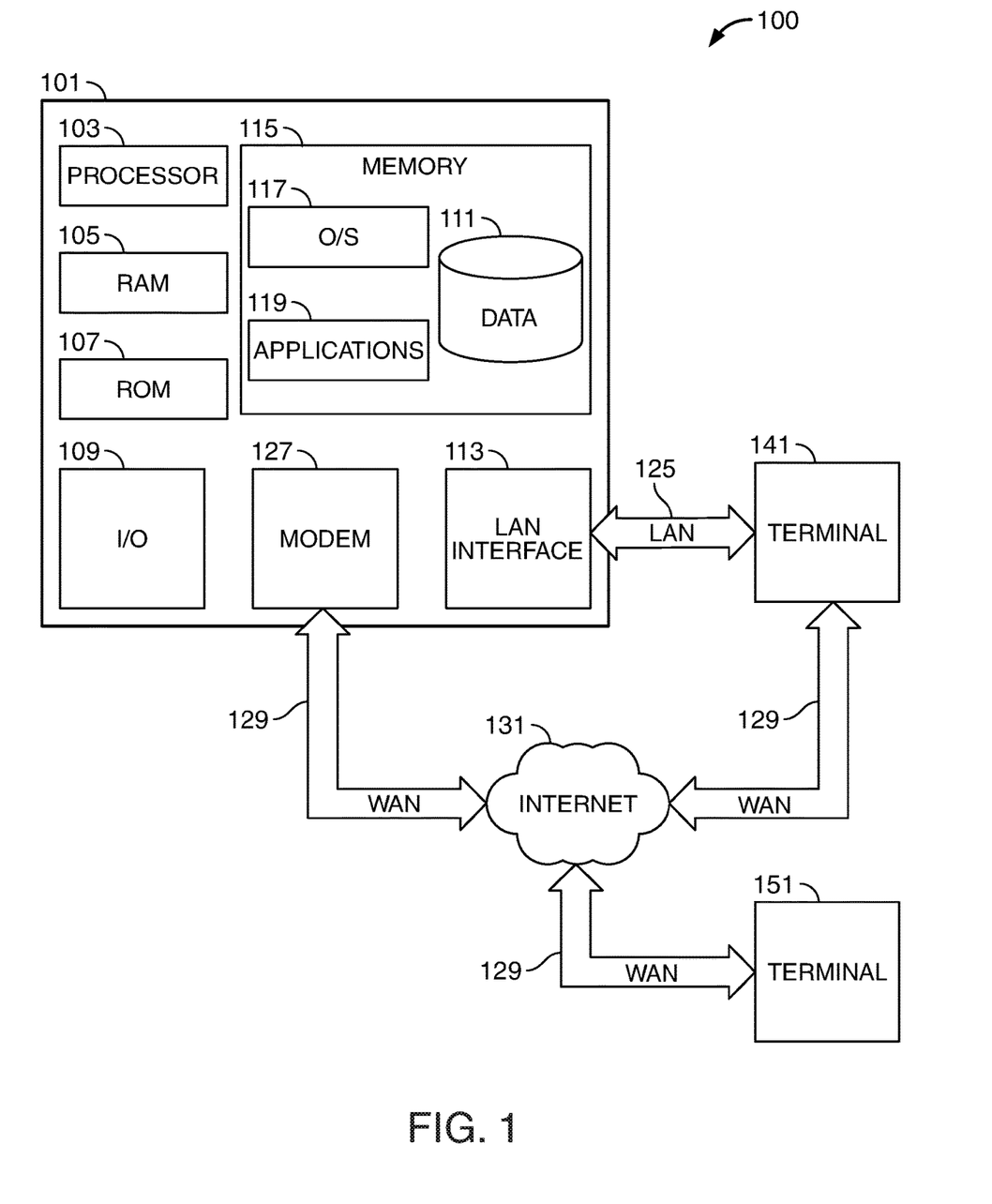
FIG. 1 shows an illustrative system in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input/output module may also include one or more speakers for providing audio output and a video display device for providing textual, audio, audiovisual, and/or graphical output. The input and output may be related to transaction routing.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to transaction routing.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
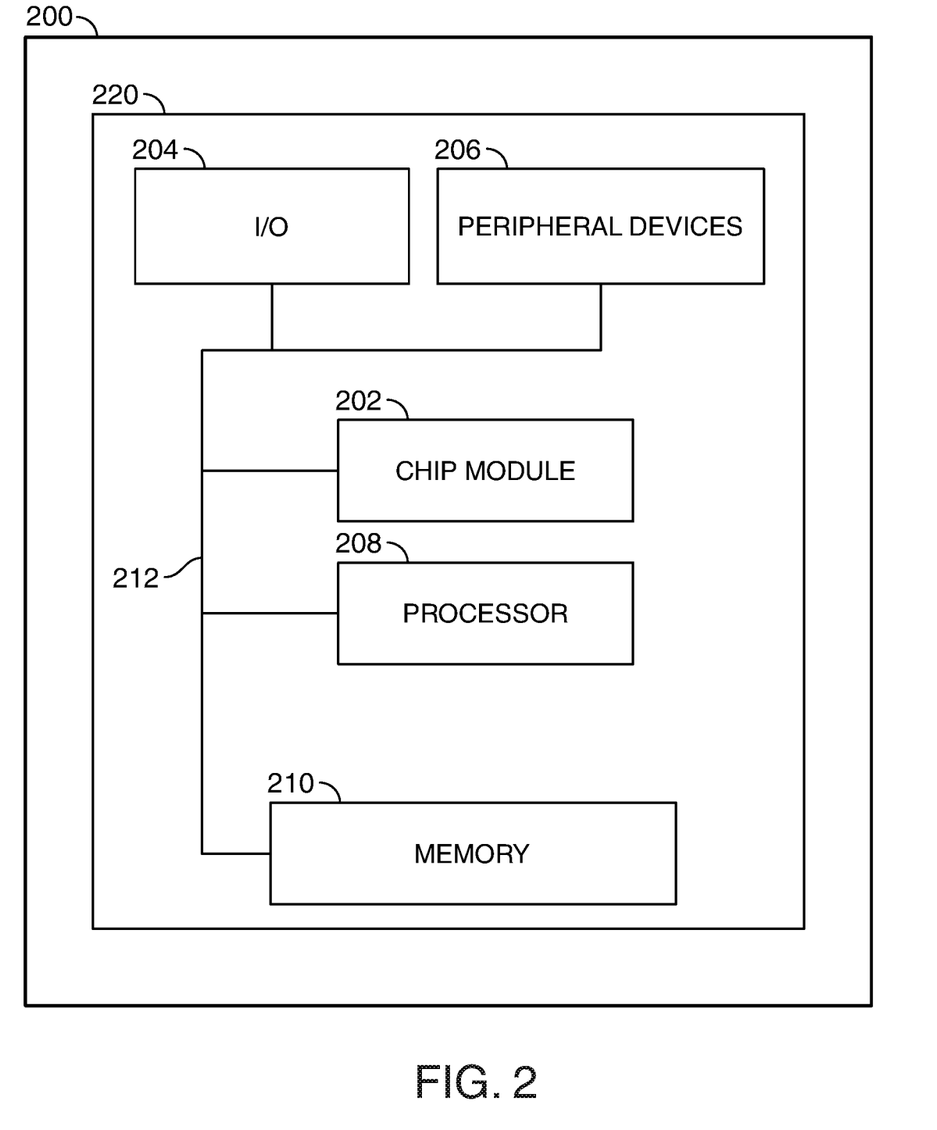
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
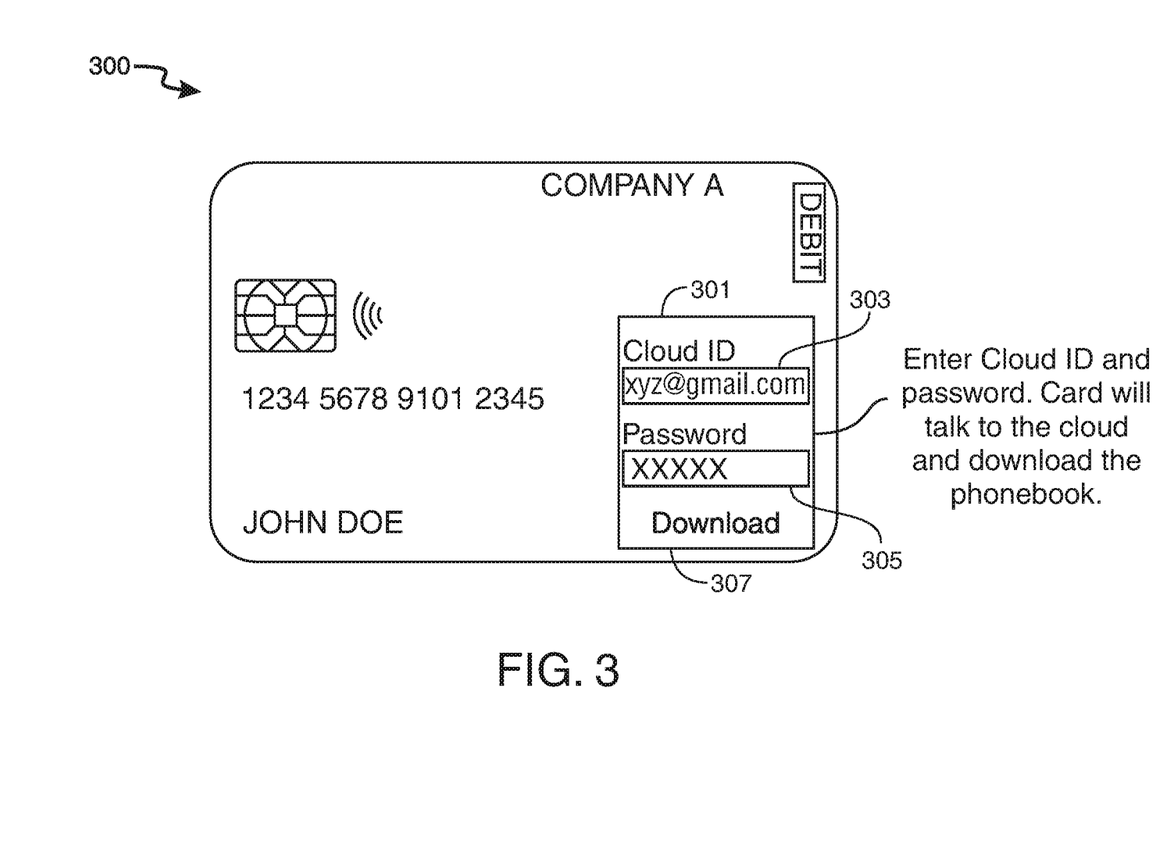
FIG. 3 shows an illustrative smart card in accordance with principles of the disclosure.

FIG. 3 shows illustrative smart card 300 configured in accordance with principles of the disclosure. Smart card 300 includes display screen 301. Display screen 301 may show smart card 300 in the process of accessing a directory. Display screen 301 may include field 303 for directory ID (e.g., an email address used to login to a cloud-based directory) and field 305 for directory password. Display screen 301 may also include a tactile sensor, which in FIG. 3 may be implemented as a touchscreen enabled display screen. Display screen 301 may, for example, include button 307, which may direct the smart card to download contacts from the cloud-based directory to a local (e.g., embedded in the smart card) memory.

FIGS. 4-8 also show illustrative smart cards configured in accordance with principles of the disclosure. The smart cards shown in FIGS. 4-8 may be substantially the same as smart card 300 shown in FIG. 3. The smart cards shown in FIGS. 4-8 may show various other smart card features and process steps.

Figure 4:
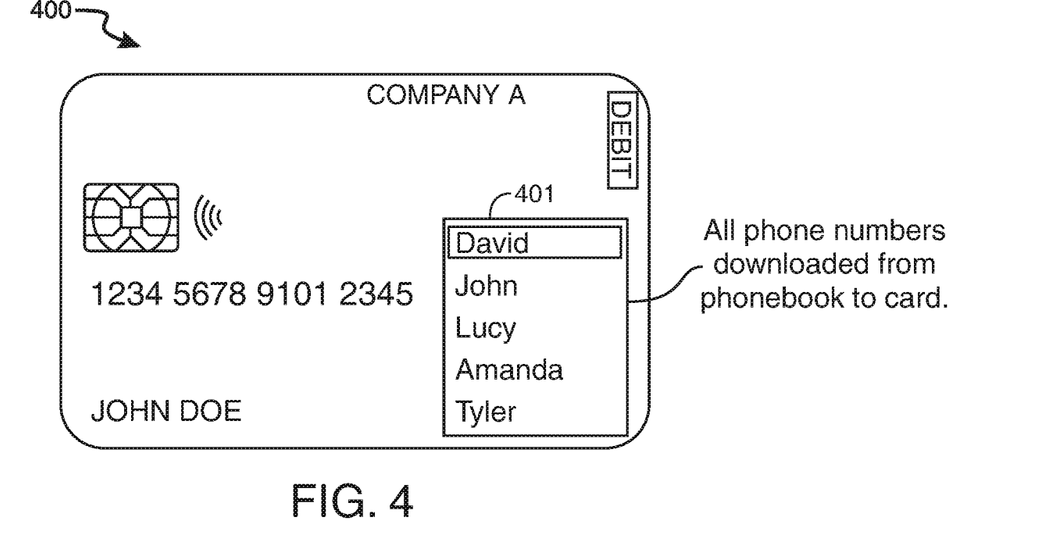
FIG. 4 shows another illustrative smart card in accordance with principles of the disclosure.
Figure 5:
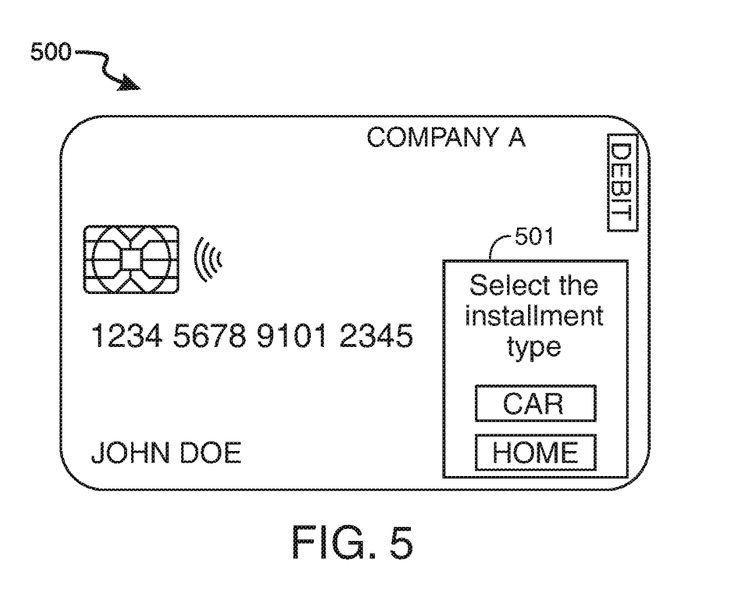
FIG. 5 shows yet another illustrative smart card in accordance with principles of the disclosure.
Figure 6:
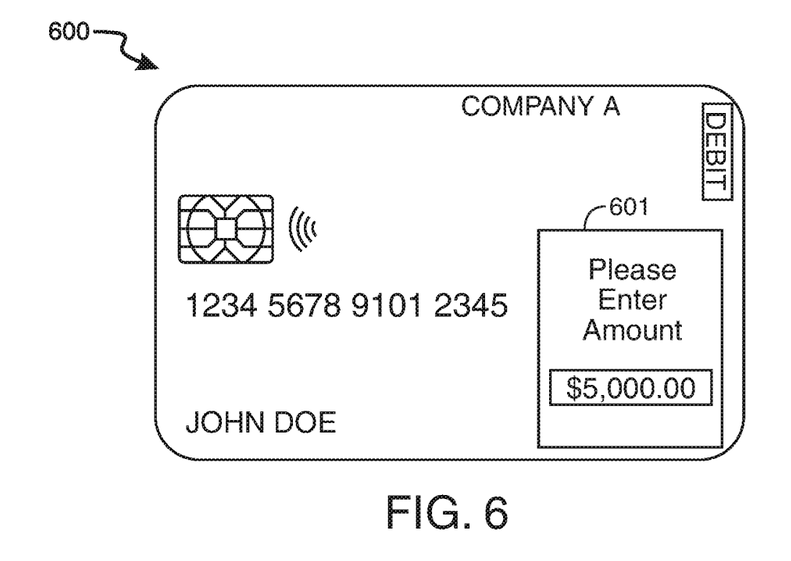
FIG. 6 shows still another illustrative smart card in accordance with principles of the disclosure.
Figure 7:
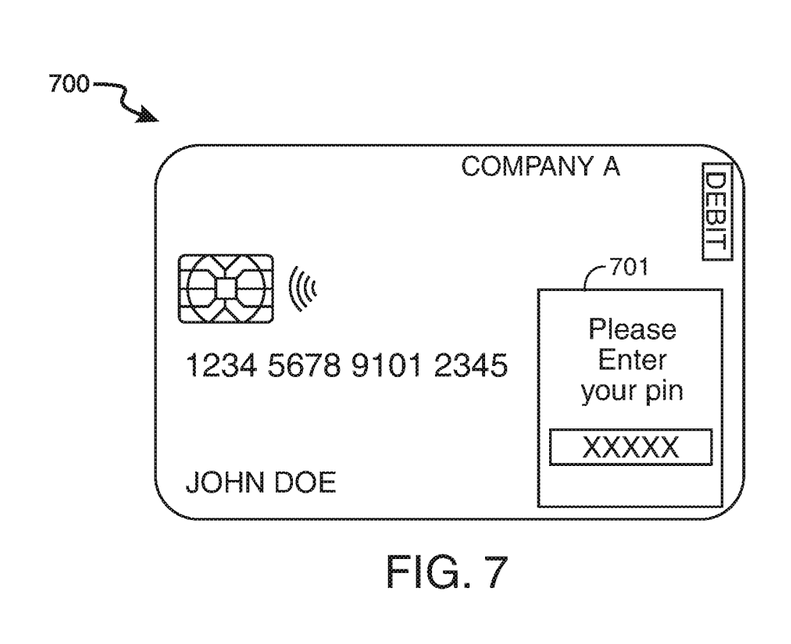
FIG. 7 shows an illustrative smart card in accordance with principles of the disclosure.
Figure 8:
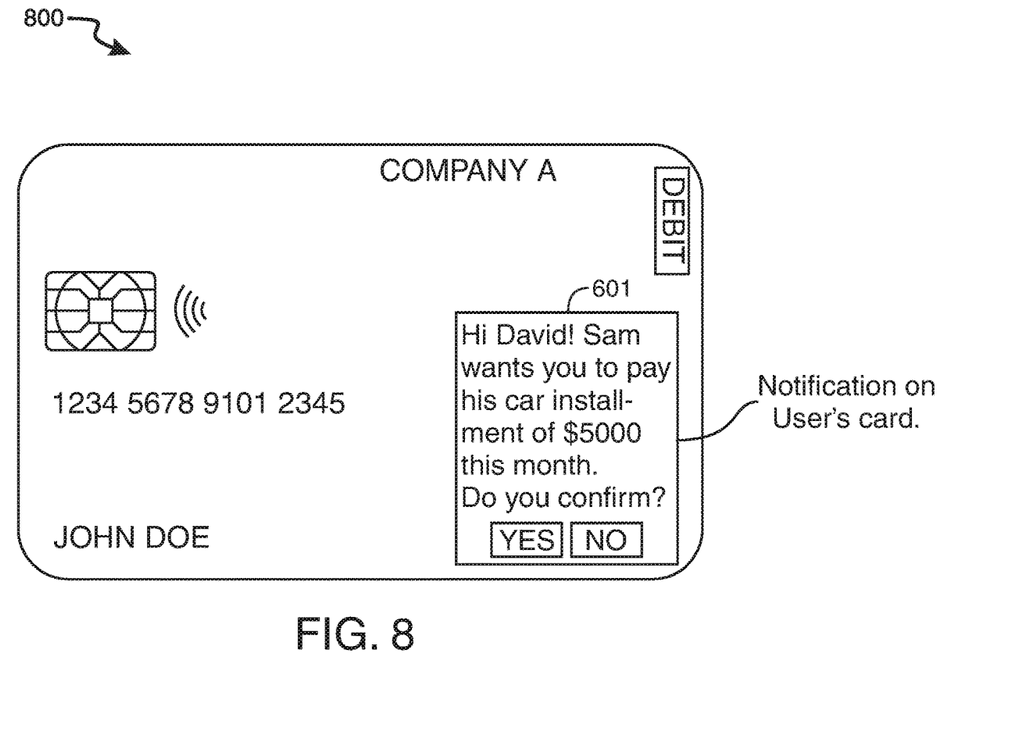
FIG. 8 shows another illustrative smart card in accordance with principles of the disclosure.

Display screen 401 of smart card 400 shown in FIG. 4 may be displaying a list of contacts in the smart card directory. Display screen 501 of smart card 500 shown in FIG. 5 may be displaying a list of payment options from which the user may select for rerouting Display screen 601 of smart card 600 shown in FIG. 6 may be displaying a prompt for the user to enter a payment amount for rerouting. Display screen 701 of smart card 700 shown in FIG. 7 may be displaying a prompt for the user to enter a personal identification number (PIN). Display screen 801 of smart card 800 shown in FIG. 8 may be displaying the request on a card of the contact from whom the payment is to be rerouted. The request may include a prompt to authorize the rerouting. Authorization may include pressing a "Yes" or "Confirm" button. Authorization may also include entry of a PIN or password.

Figure 9:
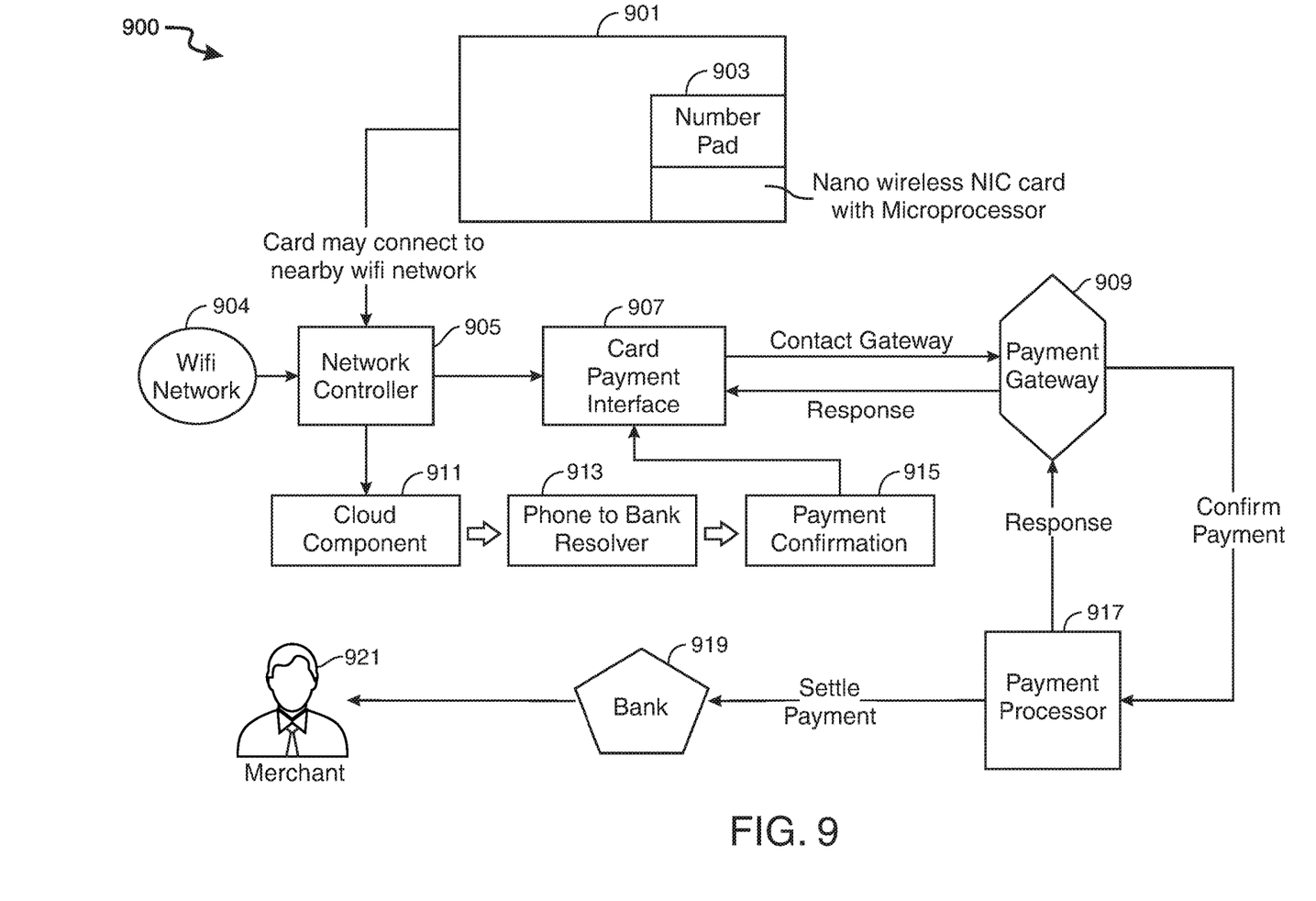
FIG. 9 shows an illustrative system diagram in accordance with principles of the disclosure.

FIG. 9 shows illustrative system diagram 900 in accordance with principles of the disclosure. Diagram 900 includes smart card 901. Smart card 901 may include a camera, wireless connector, microprocessor, and tactile sensor/display 903. Card 901 may connect to a nearby WiFi network 904 via a network controller 905. The card may connect to payment gateway 909 via payment interface 907. The card may connect to cloud component 911 to generate an internal database. Based on receipt of a request to reroute the payment, the card may request authorization from the alternative payment method. When authorization is received, the card may resolve routing information for the alternative method via resolver 913. The card may process the payment via payment processor 917. The payment may be processed via bank 919. The payment may be transmitted to recipient 921, shown in this scenario as merchant 921.

The card may also determine a payment pathway via merchant resolver 913. Card payment interface 911 may pay the amount owed over payment gateway 915, which may include payment processor 917. The payment may be executed from an account of the user at bank 919 to an account associated with payment recipient 921. When the payment is rerouted, the user may receive confirmation via text, email, or any other suitable communication method.

Figure 10:
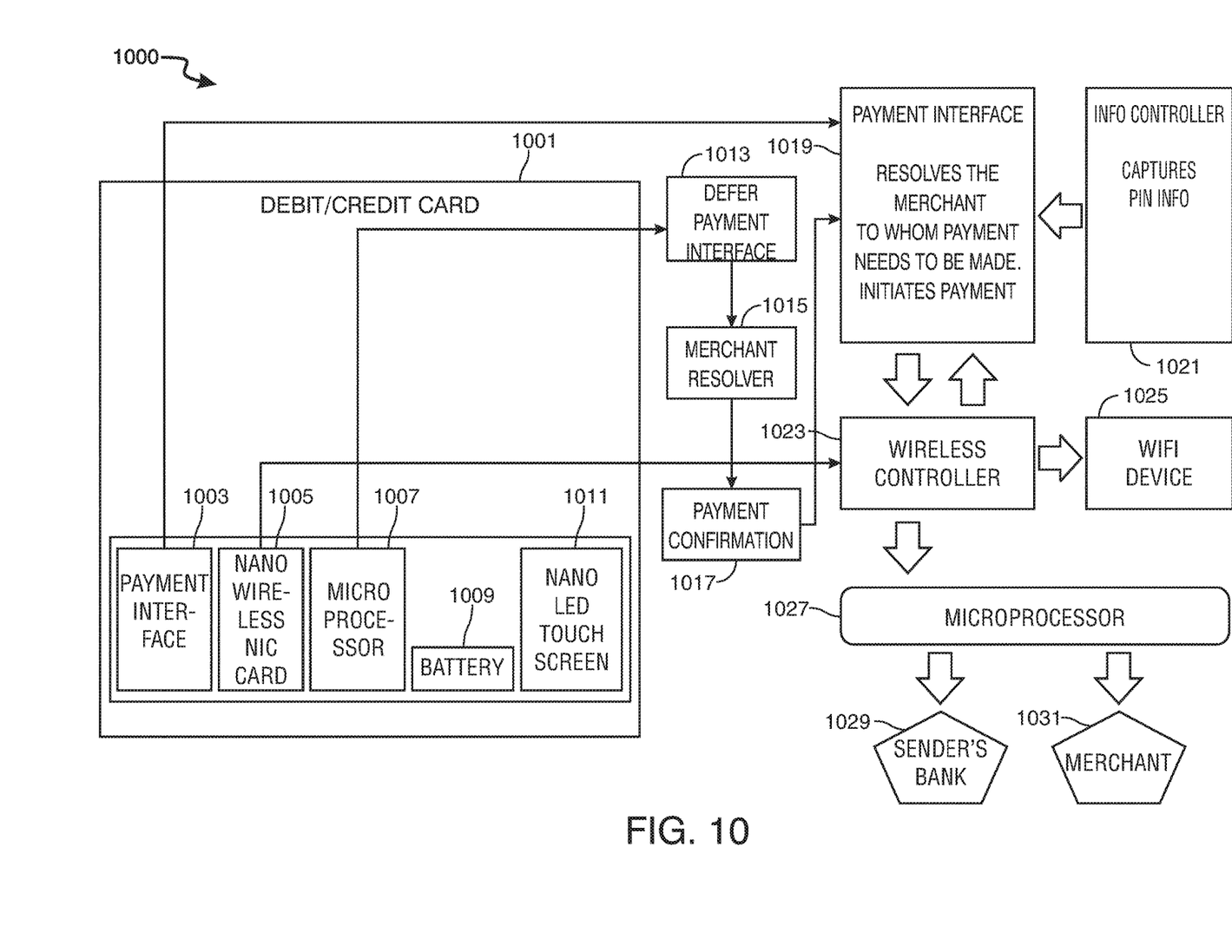
FIG. 10 shows another illustrative system diagram in accordance with principles of the disclosure.

FIG. 10 shows illustrative system diagram 1000 in accordance with principles of the disclosure. Diagram 1000 includes smart card 1001. Card 1001 includes payment interface 1003, wireless connector 1005, microprocessor 1007, battery 1009, and touchscreen 1011. Card 1001 may determine an alternative payment routing for an outstanding payment. The payment may include a payment recipient and an amount owed. A request may be entered for the alternative payment routing. When authorization is received, the card may resolve the payment routing information, and execute the payment via the alternative payment method.

Card 1001 may execute the payment for the amount owed via payment interface 1019. The payment may be authorized by an administrator associated with the alternative routing method. Authorization may leverage information entered via touchscreen 1011, and may involve information controller 1021. Card 1001 may communicate via wireless controller 1023, and may use WiFi device 1025 to communicate to an outside network. Microprocessor 1027 may coordinate the processing and communication of the system. Card 1001 may execute payments to merchant (i.e., payment recipient) 1031 through bank 1029.

Certain embodiments may include a defer payment feature 1013. Defer payment may include the ability of the user to request an extension of time to pay the payment. This feature may in certain embodiments, be independent of alternative routing methods. In certain embodiments, the defer payment feature may request a loan from the alternative payment.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a smart card with distributed payment channels and autonomous resolution thereof are provided. Persons skilled in the art will appreciate that the present invention can be practiced by other than the described embodiments, which are presented for purposes of illustration rather than of limitation, and that the present invention is limited only by the claims that follow.

What is claimed is:

1. A platform with autonomous payment routing, said platform comprising:
   a server storing a digital contact directory associated with a first user, wherein the digital contact directory comprises a directory ID of the first user and contacts associated with the directory ID;
   a smart card of the first user;
   wherein the smart card comprises:
      a smartcard housing, wherein the smartcard housing is made from metal and/or plastic, and the smartcard housing has dimensions being no greater than 86 millimeters X 54 millimeters X 0.8 millimeters;
      a microprocessor;
      a display screen;
      a power source for the microprocessor and the display screen;
      an input element;
      a wireless communication element; and
      a non-transitory memory storing a database and computer-executable instructions, that, when run on the microprocessor, are configured to:
         store information of a first account of the first user;
         receive, via the input element, the directory ID of the first user to access the server;
         download, from the server, the digital contact directory associated with the first user by accessing the server using the directory ID, wherein each contact of the contacts in the downloaded digital contact directory comprises a name and a phone number;
         store, in the database, the contacts based on the downloaded digital contact directory;
         receive a first request, via the input element from the first user, to reroute a digital payment via an alternate payment channel, wherein said digital payment comprises a recipient and an amount, wherein said alternate payment channel is to pay the amount to the recipient for the first user, wherein receiving the first request further comprises:
            displaying, via the display screen, a list of contacts to prompt the first user to select for the alternative payment channel, wherein the list of contacts is based on the stored contacts in the database;
            receiving, via the input element, a selection of a second contact from the displayed list of contacts, wherein the second contact is the alternate payment channel selected by the first user;
            displaying, via the display screen, an amount to prompt the first user to enter for rerouting the digital payment; and
            receiving, via the input element, the amount entered by the first user;
         display, via the display screen, a confirmation for the first request to reroute the digital payment via the alternate payment channel, wherein the confirmation comprises the amount, the recipient and the second contact;
         determine a routing information for a second account associated with the second contact using a second name and a second phone number of the second contact stored in the database;
         transmit, via the wireless communication element, to an administrator of the second account, a second request for authorization to reroute the amount of the digital payment to the second account;
         receive, from the administrator of the second account, an authorization response of the second request; and
         based on the received authorization response, reroute the digital payment to the recipient via the alternate payment channel by executing the digital payment from the second account to an account associated with the recipient, over a payment gateway, to a payment network for payment processing.

2. The platform of claim 1, wherein the receiving the amount entered by the first user further comprises:
   determining whether the amount of the payment exceeds a predetermined threshold;
   based on determining that the amount of the payment exceeds the predetermined threshold, triggering an alert; and
   wherein the displaying the confirmation for the first request further comprises displaying the alert comprising a message on the display screen, and wherein the message includes a prompt for entering a request to reroute the payment.

3. The platform of claim 1, wherein the first smart card further comprises an artificial-intelligence (AI) based recommendation engine, wherein said recommendation engine is configured to generate a recommended list of contacts, wherein said recommended list is a subset of the contacts stored in the database, wherein displaying the list of contacts for the alternative payment channel further comprises presenting the recommended list on the display screen.

4. The platform of claim 1, wherein the determining the routing information for the second account comprises searching a financial institution for the second account by providing the second name and the second phone number of the second contact associated with the second account; and
   wherein the executing the digital payment from the second account over the payment gateway to the payment network further comprises relaying, to one of the financial institutions, the authorization of the second request from the administrator.

5. The platform of claim 1, wherein the server storing the digital contact directory is cloud-based.

6. The platform of claim 1, wherein the receiving the first request further comprises receiving an entry of a personal identification number (PIN) of the first user.

7. The platform of claim 1, wherein the smart card comprises a touchscreen, wherein the touchscreen comprises the display screen and the input element.

8. The platform of claim 1, wherein:
   the wireless communication element is a nano wireless network interface card ("NIC"); and
   the power source is rechargeable via solar energy, inductive charging, and/or a charging port.

9. A method for autonomous payment routing using a platform comprising a server storing a digital contact directory associated with a first user, wherein the digital contact directory comprises a directory ID of the first user and contacts associated with the directory ID, and a smart card of the first user, wherein the smart card comprises a smartcard housing, a microprocessor, a display screen, a power source, an input element, a wireless communication element, a non-transitory memory storing a database, said method comprising:

storing, by the smart card, information of a first account of the first user;

receiving, by the smart card via the input element, the directory ID of the first user to access the server;

downloading, by the smart card from the server, the digital contact directory associated with the first user by accessing the server using the directory ID, wherein each contact of the contacts in the downloaded digital contact directory comprises a name and a phone number;

storing, by the smart card in the database, the contacts based on the downloaded digital contact directory;

receiving, by the smart card via the input element from the first user, a first request to reroute a digital payment via an alternate payment channel, wherein said digital payment comprises a recipient and an amount, wherein said alternate payment channel is to pay the amount to the recipient for the first user, wherein receiving the first request further comprises:

displaying, via the display screen, a list of contacts to prompt the first user to select for the alternative payment channel, wherein the list of contacts is based on the stored contacts in the database;

receiving, via the input element, a selection of a second contact from the displayed list of contacts, wherein the second contact is the alternate payment channel selected by the first user;

displaying, via the display screen, an amount to prompt the first user to enter for rerouting the digital payment; and         receiving, via the input element, the amount entered by the first user;

displaying, by the smart card via the display screen, a confirmation for the first request to reroute the digital payment via the alternate payment channel, wherein the confirmation comprises the amount, the recipient and the second contact;

determining, by the smart card, a routing information for a second account associated with the second contact using a second name and a second phone number of the second contact stored in the database;

transmitting, by the smart card via the wireless communication element, to an administrator of the second account, a second request for authorization to reroute the amount of the digital payment to the second account;

receiving, by the smart card from the administrator of the second account, an authorization response of the second request; and     based on the received authorization response, rerouting, by the smart card, the digital payment to the recipient via the alternate payment channel by executing the digital payment from the second account to an account associated with the recipient, over a payment gateway, to a payment network for payment processing.

10. The method of claim 9, wherein the receiving the amount entered by the first user further comprises:

determining whether the amount of the payment exceeds a predetermined threshold;

based on determining that the amount of the payment exceeds the predetermined threshold, triggering an alert; and     wherein the displaying the confirmation for the first request further comprises displaying the alert comprising a message on the display screen, and wherein the message includes a prompt for entering a request to reroute the payment.

11. The method of claim 9, wherein the first smart card further comprises an artificial-intelligence (AI)-based recommendation engine, the method further comprises:

generating, by the smart card via the artificial-intelligence (AI)-based recommendation engine, a recommended list of contacts, wherein said recommended list is a subset of the contacts stored in the database; and     wherein displaying the list of contacts for the alternative payment channel further comprises presenting the recommended list on the display screen.

12. The method of claim 9, wherein the determining the routing information for the second account comprises searching a financial institution for the second account by providing the second name and the second phone number of the second contact associated with the second account; and     wherein the executing the digital payment from the second account over the payment gateway to the payment network further comprises relaying, to one of the financial institutions, the authorization of the second request from the administrator.

13. The method of claim 9, wherein the server storing the digital contact directory is cloud-based.

14. The method of claim 9, wherein the receiving the first request further comprises receiving an entry of a personal identification number (PIN) of the first user.

15. The method of claim 9, wherein the smart card comprises a touchscreen, wherein the touchscreen comprises the display screen and the input element.

16. The method of claim 9, wherein the smartcard housing is made from metal and/or plastic, and the housing has dimensions being no greater than 86 millimeters X 54 millimeters X 0.8 millimeters.

17. The method of claim 9, wherein:

the wireless communication element is a nano wireless network interface card ("NIC"); and     the power source is rechargeable via solar energy, inductive charging, and/or a charging port.

* * * * *